(12) United States Patent
Wu (10) Patent No.: US 11,227,527 B2
(45) Date of Patent: Jan. 18, 2022

(54) DISPLAY PANEL HAVING DIFFERENT COLOR SUB-PIXELS IN THE SAME COLUMN

(71) Applicant: KUNSHAN GO-VISIONOX OPTO-ELECTRONICS CO., LTD., Kunshan (CN)

(72) Inventor: Jianlong Wu, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 416 days.

(21) Appl. No.: 16/336,652

(22) PCT Filed: May 10, 2018

(86) PCT No.: PCT/CN2018/086293
§ 371 (c)(1),
(2) Date: Mar. 26, 2019

(87) PCT Pub. No.: WO2019/041881
PCT Pub. Date: Mar. 7, 2019

(65) Prior Publication Data
US 2021/0295761 A1  Sep. 23, 2021

(30) Foreign Application Priority Data

Aug. 31, 2017  (CN) .......................... 201710774058.5

(51) Int. Cl.
*G09G 3/20* (2006.01)
*G09G 3/32* (2016.01)

(52) U.S. Cl.
CPC ............ *G09G 3/2003* (2013.01); *G09G 3/32* (2013.01); *G09G 2300/0452* (2013.01)

(58) Field of Classification Search
CPC ................................................... G09G 3/2003
(Continued)

(56) References Cited

U.S. PATENT DOCUMENTS

2006/0209243 A1     9/2006  Chen et al.
2008/0284758 A1*  11/2008  Lee ....................... G09G 3/3688
                                                                  345/204

(Continued)

FOREIGN PATENT DOCUMENTS

CN       1617209 A       5/2005
CN     101078844 A      11/2007
(Continued)

OTHER PUBLICATIONS

International Search Report dated Jul. 25, 2018 in corresponding International application No. PCT/CN2018/086293; 6 pages.
(Continued)

*Primary Examiner* — Long D Pham
(74) *Attorney, Agent, or Firm* — Maier & Maier, PLLC (57) ABSTRACT

A display panel and a display device are disclosed. The display panel includes a number of sub-pixels formed in a display region. Each sub-pixel includes a light-emitting unit and a drive switch. Each light-emitting unit includes a first electrode, and the drive switch is electrically connected to the first electrode. The light-emitting units in the multiple sub-pixels form a pixel array including a number of pixel columns, and light-emitting units in at least one pixel column of the pixel array correspond to sub-pixels of at least two different colors. The drive switches in the multiple sub-pixels form a drive array including a number of drive columns. The drive array includes two drive columns in which, the drive switches electrically connected to light-emitting units of a same color are connected to a same data line.

17 Claims, 7 Drawing Sheets

(58) Field of Classification Search
USPC .......................................................... 345/694
See application file for complete search history.

(56) References Cited

U.S. PATENT DOCUMENTS

| | | | |
|---|---|---|---|
| 2009/0179842 A1 | 7/2009 | Chen et al. | |
| 2011/0001749 A1* | 1/2011 | Min | G09G 3/3688 345/214 |
| 2018/0151145 A1* | 5/2018 | Lee | G09G 3/3688 |
| 2018/0247587 A1* | 8/2018 | Kimura | G09G 3/3233 |

FOREIGN PATENT DOCUMENTS

| | | |
|---|---|---|
| CN | 103383512 A | 11/2013 |
| CN | 104656295 A | 5/2015 |
| CN | 106444196 A | 2/2017 |
| KR | 10-2007-0059340 A | 6/2007 |
| KR | 20090041787 A | 4/2009 |
| TW | 200931363 A | 7/2009 |
| TW | I433110 A | 4/2014 |
| TW | 201448077 A | 12/2014 |
| TW | 201714156 A | 4/2017 |
| TW | I595467 B | 8/2017 |
| WO | WO 2016/203841 * | 12/2016 |

OTHER PUBLICATIONS

Taiwanese Office Action dated Jan. 3, 2019 in corresponding TW application No. 107117739; 8 pages including Partial English-language translation.
Chinese Office Action dated Jul. 23, 2019, in connection with corresponding CN Application No. 201710774058.5 (15 pgs., including machine-generated English translation).

* cited by examiner

DISPLAY PANEL HAVING DIFFERENT COLOR SUB-PIXELS IN THE SAME COLUMN

CROSS-REFERENCE TO RELATED APPLICATION

The application claims the benefit of priority of Chinese Patent Application No. 201710774058.5, filed on Aug. 31, 2017, and the entire disclosures of which are incorporated herein.

TECHNICAL FIELD

The present application relates to the field of panel display technologies, and in particular, to a display panel and a display device.

BACKGROUND

In recent years, many kinds of display panels have been developed at home and abroad, such as liquid crystal display panels, plasma display panels, electrowetting display panels, electrophoretic display panels, and organic light-emitting display panels. In addition, different pixel arrangements emerge so as to improve the pixel display resolution.

A pixel arrangement of a conventional display panel is successively arranging sub-pixels according to an RGB sequence in a row direction to form a regular pixel array. The multiple sub-pixels in a column direction of the pixel array correspond to the same color. However, this pixel arrangement in which the sub-pixels in the column direction correspond to the same color renders the display resolution unsatisfied. Therefore, many pixel arrangements which are not based on a successive RGB sequence in the row direction are emerged, so that the sub-pixels in the column direction correspond to different colors. Such an irregular arrangement can improve the display resolution and achieve a desirable display effect.

In spite of the improvement in the display resolution, this irregular pixel arrangement for the display panel further makes drive switches in each column of a drive array electrically connected to the pixel array correspond to different colors. Thus, at least two data lines need to be provided for each drive column. As such, a peripheral drive circuit in a non-display region of the display panel needs to be configured with a lot of data lines, which leads to a complicated structure connected to the data lines in the peripheral drive circuit. However, a complicated peripheral drive circuit usually affects a display effect of the display panel. For example, when the peripheral drive circuit is a cell test (CT) circuit, a mura problem of black stripes usually occurs when lighting the screen in the case of a complicated CT circuit.

It can be seen that, how to optimize the peripheral drive circuit on the premise of ensuring the display effect of the display panel is of a great importance.

SUMMARY

An objective of the present application is to provide a display panel, so as to solve the problem of a complicated structure of the peripheral drive circuit after enhancement of display resolution of the display panel in the prior art.

To solve the foregoing problem, the present application provides a display panel comprising a plurality of sub-pixels formed in a display region, each of the sub-pixels comprising a light-emitting unit and a drive switch, the light-emitting unit comprising a first electrode, the drive switch being electrically connected to the first electrode, and the light-emitting units in the plurality of sub-pixels forming a pixel array comprising a plurality of pixel columns, wherein the light-emitting units in at least one pixel column of the pixel array correspond to the sub-pixels of at least two different colors; the drive switches in the plurality of sub-pixels form a drive array comprising a plurality of drive columns; and the drive array comprises two drive columns in which, the drive switches electrically connected to the light-emitting units of a same color are connected to a same data line.

Optionally, the display panel further comprises a peripheral drive circuit located in a non-display region, the peripheral drive circuit comprising a source drive circuit.

Optionally, the display panel further comprises a plurality of switch elements, wherein the data line is connected to the source drive circuit via the corresponding switch element.

Optionally, the source drive circuit comprises a switch signal line and a plurality of data signal lines; the data line is connected to the switch signal line and a corresponding one of the plurality of data signal lines in the source drive circuit through the corresponding switch element; the switch signal line controls conductions of the plurality of switch elements, and the data signal lines provide data signals to the corresponding drive switches through the corresponding switch elements.

Optionally, each of the data signal lines provides a data signal for the drive switches corresponding to one of the colors, and the data lines corresponding to the same color are connected to the same data signal line.

Optionally, the drive switches in a same drive column correspond to at most two different colors, and wherein two drive columns corresponding to a same group of two colors are closely arranged next to each other, and the drive switches corresponding to the same color in the two drive columns are connected to the same data line.

Optionally, the plurality of sub-pixels correspond to three different colors, and in the drive array, the drive switches in some of the drive columns are electrically connected to the light-emitting units of one of the three different colors, and the drive switches in other ones of the drive columns are electrically connected to the light-emitting units of the other two colors of the three different colors, wherein the other ones of the drive columns are arranged in pairs with each pair of drive columns situated next to each other.

Optionally, the plurality of sub-pixels correspond to four different colors, and in the drive array, the drive switches in some of the drive columns are electrically connected to the light-emitting units of two of the four different colors, the some of the drive columns being arranged in pairs with each pair of drive columns situated next to each other in pairs, and the drive switches in other ones of the drive columns are electrically connected to the light-emitting units of the other two colors of the four different colors, the other ones of the drive columns also being arranged in pairs with each pair of drive columns situated next to each other.

Optionally, each drive switch has a contact node connected to the corresponding data line, the contact nodes of the drive switches corresponding to the same color in adjacent two drive columns are aligned in a column direction, and the contacts nodes aligned in the column direction are connected to the same data line.

Optionally, the plurality of sub-pixels correspond to three different colors; in a column direction of the pixel array, the light-emitting units corresponding to the three different colors are successively arranged; and in a row direction of the pixel array, the light-emitting units corresponding to the same color are staggered along the column direction.

Optionally, the plurality of sub-pixels form a plurality of pixel units arranged in an array, and each of the pixel units comprises three sub-pixels corresponding to three different colors.

Optionally, the light-emitting units in the three sub-pixels of each of the pixel units are arranged in adjacent two columns of the pixel array, and an arrangement obtained by reversing each of the pixel units at 180 degrees along a row direction is same as an arrangement of an adjacent pixel unit in the same column.

Optionally, the light-emitting units in the three sub-pixels of each of the pixel units are arranged in a same column.

Based on the foregoing display panel, the present application also provides a display device comprising the above-described display panel.

In the display panel provided by the present application, sub-pixels in the column direction of the pixel array do not correspond to the same color. Compared with the conventional pixel arrangement in which the sub-pixels in the column direction all correspond to the same color, the display device of the present application can effectively improve the display resolution and display uniformity. As such, drive switches electrically connected to light-emitting units of the same color in the two adjacent drive columns of the drive array are connected to the same data line. That is, drive switches corresponding to the same color in two drive columns are all connected to the same data line, so that each data line is connected to drive switches of the same color. In this manner, a connection between the data lines and a peripheral drive circuit is simplified and the structure of the peripheral drive circuit can be correspondingly simplified. For example, each data line can be connected to the peripheral drive circuit by using only one switch element. In the peripheral drive circuit, only one switch signal line needs to be provided and cooperates with data signal lines corresponding to the colors of the sub-pixels, so that all switch elements connected to the data lines can be connected to the switch signal line, and the data line of a corresponding color can be connected to the corresponding data signal line, thereby the number of lines in the peripheral drive circuit is reduced. The peripheral drive circuit may be, for example, a CT circuit.

DETAILED DESCRIPTION

As described in the background, in order to achieve a high display resolution of a display panel, the prior art usually uses an irregular pixel arrangement which is not based on a successive RGB sequence, such that the light-emitting units in the column direction of the pixel array correspond to at least two colors. To adapt to this irregular pixel arrangement, drive switches are also not regularly arranged according to the RGB sequence, which not only complicates an electrical connection between the drive switches and the light-emitting units, but also complicates the peripheral drive circuit.

Figure 1:
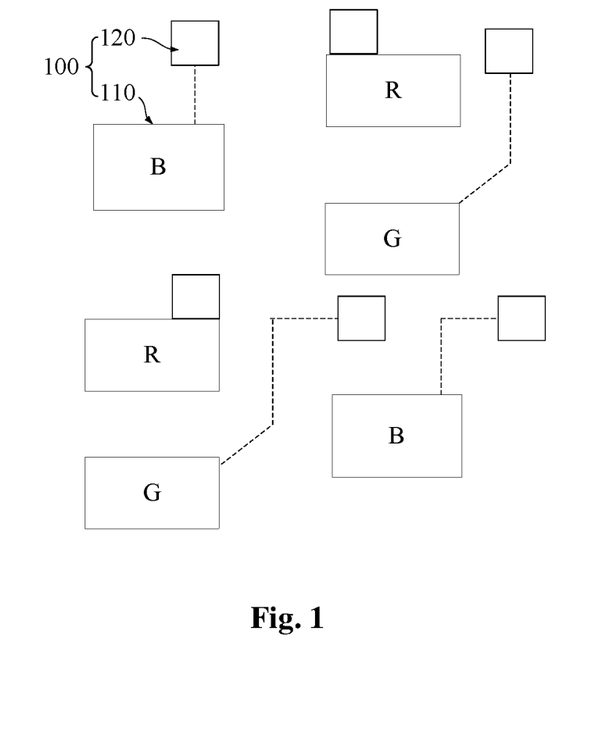
FIG. 1 is a schematic structural diagram of a display region of a display panel.

For example, FIG. 1 is a schematic structural diagram of a display region of a display panel. As shown in FIG. 1, the display panel includes a plurality of sub-pixels 100 formed in a display region of a substrate, and the plurality of sub-pixels 100 correspond to at least three colors. Each sub-pixel 100 includes a light-emitting unit 110 and a drive switch 120. Each light-emitting unit includes a first electrode, and the drive switch 120 is electrically connected to the first electrode. The light-emitting units 110 in the multiple sub-pixels form a pixel array, and the multiple light-emitting units 110 in a column direction of the pixel array form pixel columns and correspond to at least two different colors. For example, in the pixel array as shown in FIG. 1, the light-emitting units 110 in the first column successively correspond to blue B, red R and green G The light-emitting units 110 in the second column successively correspond to red R, green G, and blue B. With continued reference to FIG. 1, the drive switches 120 in the multiple sub-pixels 100 form a drive array. In the drive array, the drive switches 120 in the first column successively correspond to blue B and red R. The drive switches 120 in the second column successively correspond to red R and green G The drive switches 120 in the third column successively correspond to green G and blue B. That is, in the drive array, two drive switches 120 in each column are electrically connected to light-emitting units 110 of two different colors respectively. It can be seen that, for a pixel array which is not arranged according to a successive RGB sequence in the row direction, because the light-emitting units in the column direction of the pixel array do not correspond to the same color, the drive switches arranged in the column direction of the drive array corresponding to the pixel array also do not correspond to the same color as well.

Figure 2:
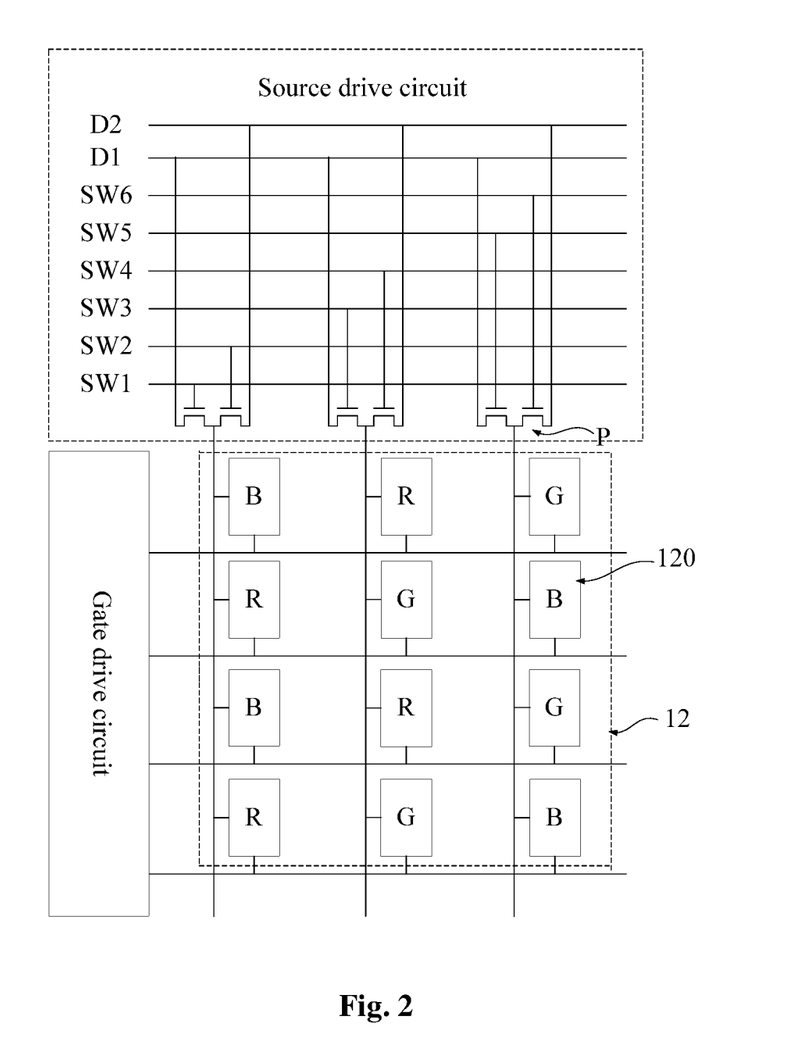
FIG. 2 is a schematic diagram showing a connection between a drive array and a peripheral drive circuit in the display panel shown in FIG. 1.

FIG. 2 is a schematic diagram showing a connection between a drive array and a peripheral drive circuit in the display panel as shown in FIG. 1, wherein the peripheral drive circuit is, for example, a CT circuit. Focusing on FIG. 2, in a drive array 12, the drive switches 120 in the same column do not correspond to the same color. Thus, the multiple drive switches 120 in the same drive column need to be provided with corresponding data signals according to the different colors. That is, several switch elements P need to be set in the same drive column according to the different colors, so as to be connected to the peripheral drive circuit. Accordingly, corresponding switch signal lines further need to be provided in the peripheral drive circuit for the several switch elements P corresponding to the different colors, so as to control a connection/disconnection of the different switch elements P by using the corresponding switch signal lines. Thus, data signals can be provided for the sub-pixels of different colors by using the different switch elements P.

Because the multiple drive switches 120 in each drive column correspond to at least two colors, at least two corresponding switch elements P also need to be set in each drive column. Moreover, in order to provide corresponding data signals for the drive switches 120 of different colors in the different drive columns, a lot of switch signal lines need to be further set, so as to control the switch elements P corresponding to different colors in the different drive columns, which directly complicates the structure of the used peripheral drive circuit. For example, as shown in FIG. 2, the multiple drive switches 120 in the first column correspond to blue B and red R, therefore it is required to provide two switch elements P which are respectively connected to switch signal lines SW1 and SW2. Similarly, it is also required to set two switch elements P in the second drive column, and correspondingly provide switch signal lines SW3 and SW4. It is further required to set two switch elements P in the third drive column, and correspondingly provide switch signal lines SW5 and SW6.

The display resolution and display uniformity of the display panel can be improved when the irregular pixel arrangement is used to enable multiple light-emitting units in the column direction of the pixel array to correspond to at least two colors. However, it can be known from FIGS. 1 and 2 that, such an arrangement complicates the connection between the light-emitting units and the drive switches in the sub-pixels, and further complicates the structure of the peripheral drive circuit.

Therefore, the present application provides a display panel, which includes a plurality of sub-pixels formed in a display region of a substrate. Each sub-pixel includes a light-emitting unit and a drive switch. The light-emitting unit includes a first electrode, and the drive switch is electrically connected to the first electrode. The light-emitting units in the multiple sub-pixels form a pixel array. Multiple light-emitting units in at least one pixel column of the pixel array correspond to sub-pixels of at least two colors. The drive switches in the multiple sub-pixels form a drive array. In two drive columns of the drive array, drive switches electrically connected to light-emitting units of the same color are connected to the same data line.

That is, in the display panel of the present application, an irregular pixel arrangement is still used, such that the multiple light-emitting units in the pixel columns do not correspond to the same color, thus ensuring a high resolution of the display panel. As such, in adjacent two drive columns of the drive array, drive switches electrically connected to light-emitting units of the same color are connected to the same data line, such that multiple drive switches connected to each data line all correspond to the same color, thus the structure of the peripheral drive circuit connected to the data lines is simplified.

A display panel and a display device of the present application are further described in detail below with reference to the accompanying drawings and specific embodiments.

Embodiment 1

Advantages and features of the present application will be more apparent from the following description. It should be noted that the accompanying drawings are presented in a very simplified form not necessarily presented to scale, with the only intention to facilitate convenience and clarity in explaining the embodiments of the present application.

Figure 3:
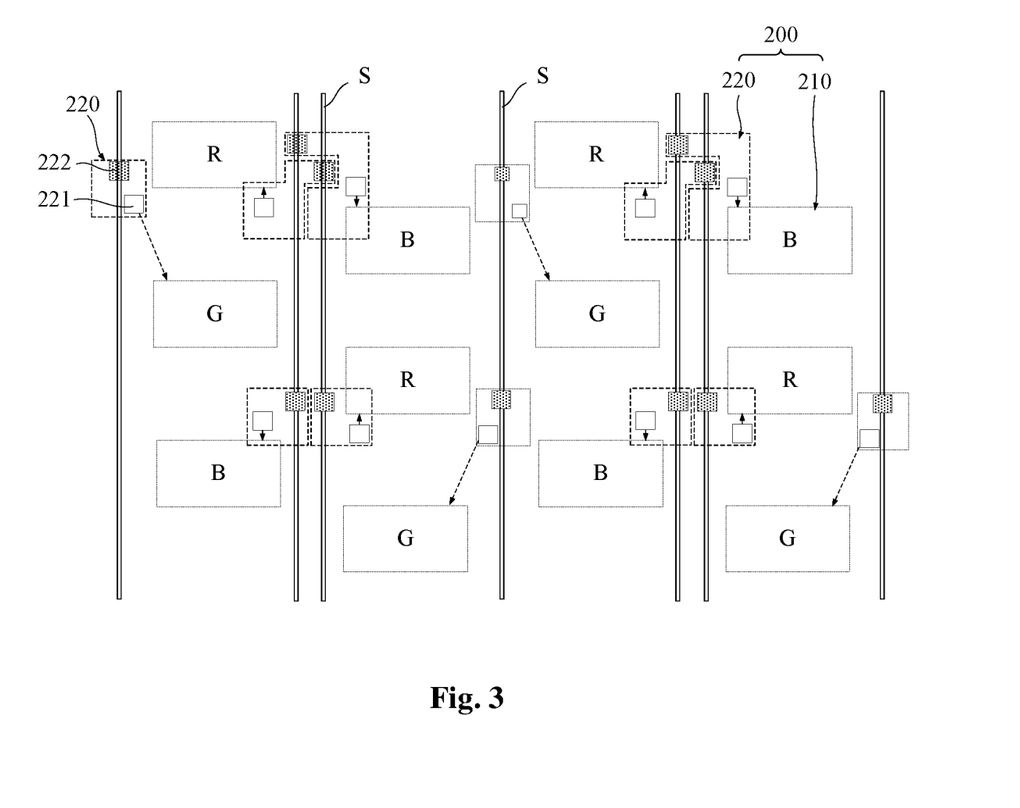
FIG. 3 is a schematic structural diagram of a display region of a display panel in Embodiment 1 of the present application.

FIG. 3 is a schematic structural diagram of a display region of a display panel in Embodiment 1 of the present application. As shown in FIG. 3, the display panel includes a plurality of sub-pixels 200 formed in a display region of the substrate. The plurality of sub-pixels 200 correspond to at least three colors which are, for example, red R, blue B, and green G This embodiment uses an example in which the multiple sub-pixels 200 correspond to three colors to make an explanation and a description. Alternatively, in order to further improve a display effect of the display panel, the multiple sub-pixels may also correspond to four different colors which are, for example, red, green, blue, and white, or red, green, blue, and yellow. FIG. 3 schematically shows only some sub-pixels 200.

Each of the sub-pixels 200 includes a light-emitting unit 210 and a drive switch 220. Each light-emitting unit 210 includes a first electrode (not shown in the figure), and the drive switch 220 is electrically connected to the first electrode. Further, the light-emitting unit 210 also includes a second electrode (not shown in the figure), and a light-emitting layer (not shown in the figure) located between the first electrode and the second electrode. The first electrode may serve as an anode, and the second electrode may serve as a cathode.

The light-emitting units 210 of the multiple sub-pixels 200 form a pixel array, and multiple light-emitting units 210 in the same column form a pixel column. The pixel array has pixel columns in which multiple light-emitting units 210 in a column direction correspond to at least two different colors. For example, in the pixel array, multiple light-emitting units in some pixel columns correspond to at least two different colors, and multiple light-emitting units in some other pixel columns correspond to only one color. Of course, multiple light-emitting units in each pixel column of the pixel array may also correspond to at least two different colors.

Moreover, the drive switches 220 of the multiple sub-pixels 200 form a drive array. In the drive array, drive switches 220 electrically connected to light-emitting units 210 of the same color and in two adjacent drive columns are connected to the same data line S. Preferably, in the drive array, drive switches 220 corresponding to the same color and in two adjacent drive columns are connected to the same data line S.

That is, by adopting an irregular pixel arrangement, the pixel array has pixel columns in which multiple light-emitting units 210 in the column direction do not correspond to the same color, a display resolution of the display panel can be effectively improved. As such, the drive switches corresponding to the same color in two adjacent drive columns of the drive array are connected to the same data line. Because each data line S is connected to the drive switches 220 of the same color, the structure of the peripheral drive circuit connected to the data lines is simplified. For example, each data line S is connected to the peripheral drive circuit by using only one switch element, and only one switch signal line needs to be set in the peripheral drive circuit. All the data lines S can be connected to the same switch signal line, thus the number of the switch signal lines in the peripheral drive circuit is greatly reduced. It should be noted that, the term "column" in the specification does not refer to a column in the sense of predetermined space. For example, it may also be referred to as "row" from a different angle. Similarly, the term "row" in the specification may also be referred to as "column" from a different angle.

With continued reference to FIG. 3, in order to conveniently connect the drive switches 220 corresponding to the same color in different drive columns to the same data line S, multiple drive switches 220 in the same drive column correspond to at most two different colors preferably. Thus, when a drive column corresponds to only one color, each of the drive switches in this drive column can be connected to the same data line. When a drive column corresponds to two different colors, two drive columns corresponding to the same two colors can be closely arranged next to each other. Further, multiple drive columns corresponding to the same two colors can be closely arranged next to each other in pairs, such that drive switches corresponding to the same color in two closely arranged drive columns can be connected to the same data line.

For example, referring to FIG. 3, in this embodiment, the plurality of sub-pixels 200 corresponds to three different colors, namely, red R, blur B, and green G In the drive array, multiple drive switches 220 in some drive columns are electrically connected to light-emitting units 210 of one of the three colors. Multiple drive switches 220 in other drive columns are electrically connected to light-emitting units 210 of the other two colors, and these drive columns are closely arranged next to each other in pairs. That is, as shown in FIG. 3, multiple drive switches 220 corresponding to green G form a drive column corresponding to green G, and multiple drive switches 220 corresponding to red R and multiple drive switches 220 corresponding to blue B form a drive column corresponding to two different colors. In the drive array, the drive columns all corresponding to two different colors (namely, red R and blue B) are closely arranged next to each other, such that the drive switches 220 all corresponding to red R in different drive columns are connected to the same data line S and the drive switches 220 all corresponding to blue B in different drive columns are connected to the same data line S.

Further, each drive switch 220 has a second contact node 222 configured to connected to the data line S. The second contact nodes 222 of multiple drive switches corresponding to the same color in adjacent two drive columns of the drive array are aligned in the column direction. The second contact nodes 222 aligned in the column direction are connected to the same data line S. That is, in order that the drive switches corresponding to the same color in adjacent two drive columns can be connected to the same data line, one solution is to directly adjust an arrangement of the drive switches, for example, to make each of the adjacent two drive columns correspond to a same color. The other solution is to adjust an arrangement of the second contact nodes 222 in the drive switches on the premise of maintaining the arrangement of the drive switches, such that multiple second contact nodes 222 corresponding to the multiple drive switches 220 in the same column are electrically connected to the light-emitting units 210 of a same color.

For example, as shown in FIG. 3, in closely arranged two drive columns each drive column corresponding to red R and blue B, the second contact nodes 222 in all drive switches are adjusted in such a manner that the second contact nodes 222 of the drive switches corresponding to red R are arranged in the same column and the second contact nodes 222 of the drive switches corresponding to blue B are arranged in the same column.

Specifically, the drive switch 220 includes a drive transistor and a switch transistor. A drain of the drive transistor may serve as a first contact node 221 electrically connected to the light-emitting unit 210. A source of the drive switch is electrically connected to a drain of the switch transistor. A source of the switch transistor serves as the second contact node 222, and is connected to the data line S.

Figure 4:
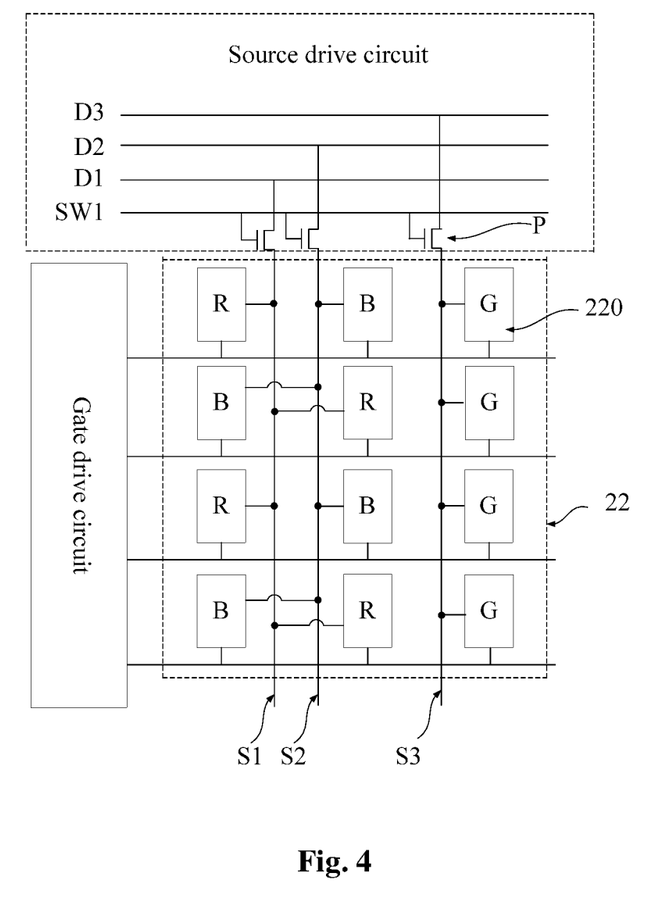
FIG. 4 is a schematic diagram showing a connection between a drive array and a peripheral drive circuit in the display panel in Embodiment 1 of the present application.
Figure 5:
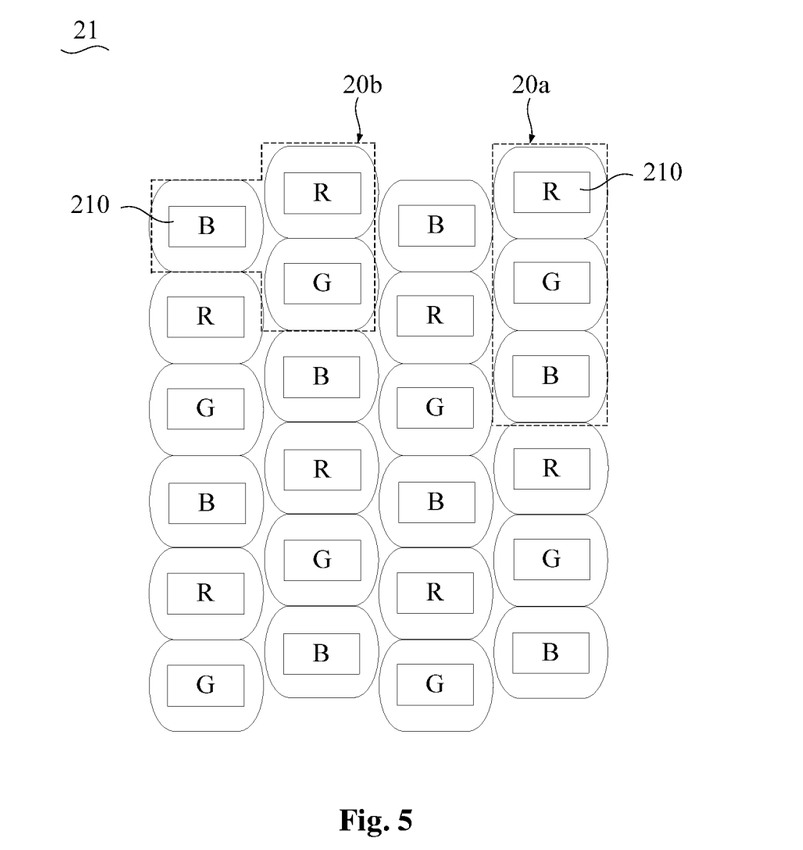
FIG. 5 is a schematic diagram of a pixel array of the display panel in Embodiment 1 of the present application.

A specific pixel arrangement is explained and described below. FIG. 4 is a schematic diagram showing a connection between a drive array and a peripheral drive circuit in the display panel in Embodiment 1 of the present application. FIG. 5 is a schematic diagram of a pixel array of the display panel in Embodiment 1 of the present application. This embodiment uses only the pixel arrays shown in FIG. 3 and FIG. 5 as examples. However, it should be noted that, provided that multiple light-emitting units in the column direction of a pixel array do not correspond to the same color, the data lines can be decreased in number and the structure of the peripheral drive circuit can be simplified according to the idea of "using a common data line" given by the present application.

With combined reference to FIG. 3 and FIG. 5, in the pixel array 21, there are pixel columns in which multiple light-emitting units 210 in the column direction correspond to at least two different colors. For example, in this embodiment, the multiple light-emitting units 210 in each pixel column correspond to at least two different colors. In the pixel array 21 as shown in FIG. 5, the light-emitting units correspond to three colors: red R, green G, and blue B in the column direction. With combined reference to FIG. 3 and FIG. 4, in this embodiment, by combing the arrangement of the drive switches 220 and a connection between the second contact nodes 222 in the drive switches 220 and the data lines S, a connection between the drive switches 220 and the data lines S is further simplified, and each data line S to be connected to the drive switches 220 of the same color is achieved.

Specifically, in the drive array 22, the drive switches 220 corresponding to one (which is green in this embodiment) of the colors are independently and repeated arranged in the column direction. The drive switches 220 corresponding to the other two colors (which are red R and blue B in this embodiment) are arranged next to each other in the column direction. The drive columns corresponding to red R and blue B are closely arranged next to each other. In this manner, the drive switches 220 corresponding to green G in a drive column may be directly connected to a data line S3. In addition, the drive switches 220 all corresponding to red R in closely arranged two drive columns may be connected to a data line S1, and specifically, the second contact nodes 222 of the drive switches corresponding to red R are all connected to the data line S1. The drive switches 220 all corresponding to blue B may be connected to a data line S2, and specifically, the second contact nodes 222 of the drive switches corresponding to blue B are all connected to the data line S2. In this embodiment, each of the closely arranged two drive columns corresponds to the same two colors (namely, red R and blue B). In the closely arranged two drive columns, two drive switches in different drive columns but in the same row of the drive array correspond to two different colors. In addition, in this embodiment, all drive switches 220 corresponding to red R and blue B are alternately arranged in the column direction. Thus, in closely arranged two drive columns, two drive switches 220, located on different drive columns, corresponding to different colors in the odd-numbered rows of the drive array are reversely arranged with respect to two drive switches 220 corresponding to different colors in the even-numbered rows (for example, the two drive switches 220 in the odd-numbered rows respectively correspond to red R and blue B, while the two drive switches 220 in the even-numbered rows respectively correspond to blue B and red R). Therefore, in the closely arranged two drive columns, a data line corresponding to the same color is connected to drive switches 220 in one of the drive columns in the odd-numbered rows, and is connected to drive switches 220 in the other drive column in the even-numbered rows. That is, the data line is connected to the drive switches 220 in different drive columns in an alternate way, such that the drive switches 220 corresponding to the same color in the closely arranged two drive columns can be connected to the same data line.

In this embodiment, based on the pixel arrangement in which the light-emitting units in each pixel column of the pixel array 21 correspond to at least two different colors, by adjusting the arrangement of the drive array and the connection between the drive switches in the drive array and the data lines, each data line connected to drive switches of the same color is achieved. However, it should be noted that, in other embodiments, in the pixel array, when the light-emitting units in some pixel columns correspond to two different colors, while the light-emitting units in other pixel columns correspond to only one color, a connection between the drive switches and the data lines, which is similar to that in this embodiment, can still be used. For example, in other embodiments, there are red light-emitting units and blue light-emitting units in some pixel columns, and there are only green light-emitting units in other pixel columns. In this case, drive switches electrically connected to the green light-emitting units can be maintained independently and repeatedly arranged in the column direction, so as to be directly connected to the same data line. It is only required to adjust the connection between the red drive switches and the corresponding data line as well as the connection between the blue drive switches and the corresponding data line. That is, in the adjacent two drive columns, the drive switches corresponding to red are connected to the same data line, and the drive switches corresponding to blue are connected to the same data line.

Figure 6:
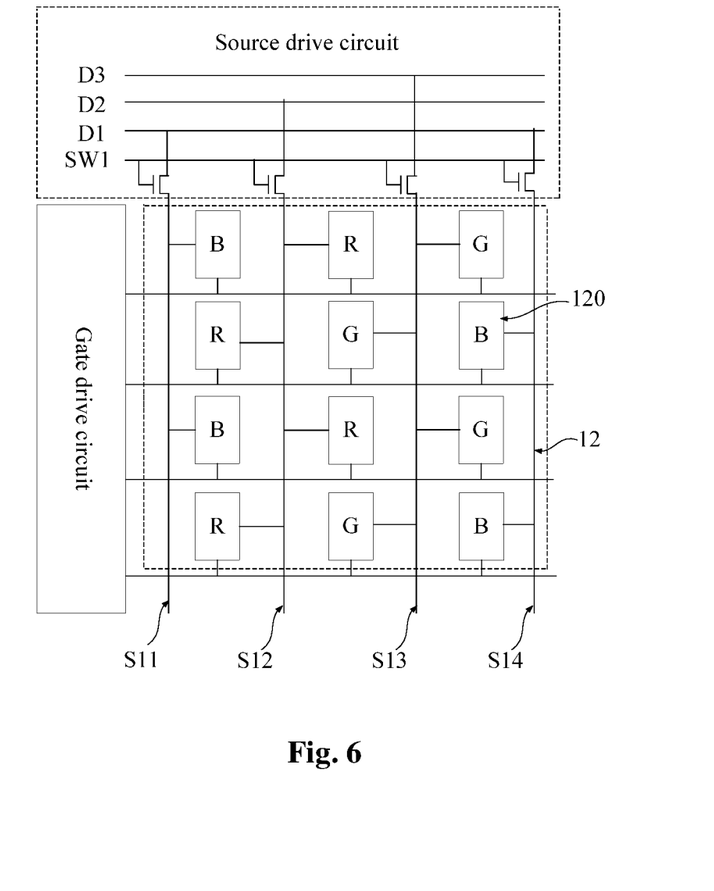
FIG. 6 is a schematic diagram showing another connection between the drive array and the peripheral drive circuit in the display panel in Embodiment 1 of the present application.

Moreover, in this embodiment, based on the arrangement in which the light-emitting units in each pixel column of the pixel array 21 correspond to at least two different colors, the arrangement (namely, the arrangement of the drive array 22 in FIG. 4) of the drive switches as well as the connection between the drive switches and the data lines are adjusted at the same time. In another optional solution, on the premise of maintaining the arrangement of the drive array 12 as shown in FIG. 2, only the connection between the drive switches 120 and the data lines is adjusted, such that the drive switches of the same color are connected to the same data line. Specifically, referring to FIG. 6, in adjacent two drive columns, drive switches electrically connected to light-emitting units of the same color are connected to the same data line. For example, the drive switches 120 all corresponding to red R in the first drive column and the second drive column can be connected to a data line S12, and the drive switches 120 all corresponding to green G in the second drive column and the third drive column can be connected to a data line S13. It should be noted that, FIG. 6 schematically shows only some drive switches. Therefore, there are other drive columns on the left side of the first drive column and the right side of the third drive column. The drive switches 120 corresponding to blue B in each of the first drive column and the third drive column and drive switches corresponding to blue B in its adjacent drive column are connected to the same data line. It can be seen that, compared with the connection between the drive switches and the data lines in FIG. 2, the connection in FIG. 6 is that each data line is connected to the drive switches of the same color, thus the structure of the peripheral drive circuit connected to the data lines is simplified. For example, during connection of the data lines to the peripheral drive circuit, each data line needs to use only one switch element P, and only one switch signal line needs to be provided in the peripheral drive circuit, so as to control the switch element P.

With continued reference to FIG. 4, the peripheral drive circuit of the display panel is located in the non-display region of the substrate, and includes a source drive circuit. The data lines connected to the drive switches 220 in the drive array 22 are connected to the source drive circuit. The peripheral drive circuit also includes a gate drive circuit which is connected to a gate line and used for providing a gate drive signal. In the drive array 22, multiple drive switches 220 in the same row are connected to the same gate line. For example, FIG. 4 merely shows drive switches 220 arranged in four rows and three columns, and are accordingly connected to four gate lines. Further, in this embodiment, each drive switch 220 also includes a switch transistor, where a source of the switch transistor is connected to the data line, and a gate of the switch transistor is connected to the gate line.

Specifically, the source drive circuit includes a switch signal line and a data signal line. Each data line is connected to the switch signal line and the data signal line by using one switch element P. The switch signal line is used for controlling a conduction of the switch element P, such that the data signal line can provide a data signal for drive switches 220 of a corresponding color by using the switch element P. Because each data line is connected to drive switches corresponding to the same color, only one switch signal line SW1 needs to be set in the source drive circuit, and all the data lines are connected to the same switch signal line SW1 by using the switch elements P. In addition, the data signal lines separately provide a data signal for the drive switches 220 corresponding to one of the colors, and the data lines corresponding to the same color are connected to the same data signal line. For example, when the plurality of sub-pixels correspond to three different colors, three data signal lines can be correspondingly set in the source drive circuit, and provide data signals for sub-pixels of three different colors respectively. Alternatively, when the plurality of sub-pixels corresponds to four different colors, four data signal lines can be correspondingly set in the source drive circuit, and provide data signals for sub-pixels of four different colors respectively. Further, the switch element P is a transistor switch, and a gate of the transistor switch is connected to the switch signal line.

With continued reference to the drive switches 220 arranged in four rows and three columns in FIG. 4, the three data lines can be connected to the same switch signal line SW1 and the three data signal lines by using respective switch elements P. The data signal line D1 can provide a data signal for red R sub-pixels, the data signal line D2 can provide a data signal for blue B sub-pixels, and the data signal line D3 can provide a data signal for green G sub-pixels. Therefore, the data line S1 connected to the red R drive switches 220 is connected to the switch signal line SW1 and the data signal line D1 by using the corresponding switch element P. The data line S2 connected to the blue B drive switches 220 is connected to the switch signal line SW1 and the data signal line D2 by using the corresponding switch element P. The data line S3 connected to the green G drive switches 220 is connected to the switch signal line SW1 and the data signal line D3 by using the corresponding switch element P.

Focusing on FIG. 5 below, the pixel array 21 of this embodiment is described in detail. In the pixel array 21, the light-emitting units 210 in the same pixel column do not correspond to the same color. In this embodiment, the light-emitting units in the pixel array 21 correspond to three different colors in the column direction, namely, blue B, red R and green G. The light-emitting units 210 corresponding to the three different colors are successively arranged. However, it should be noted that, in other embodiments, the light-emitting units in the pixel array may correspond to only two of the three colors in the column direction. In a row direction of the pixel array 21, the light-emitting units 210 of the same color are staggered, such that the light-emitting units 210 in the row direction do not correspond to the same color as well, thus the display uniformity of the display panel is further enhanced.

Further, a pixel unit in a specific display panel may also be defined according to a practical situation. A plurality of sub-pixels form a plurality of pixel units arranged in an array, and each pixel unit includes at least three sub-pixels corresponding to different colors. In this embodiment, with continued reference to FIG. 5 continuously, three sub-pixels corresponding to three adjacent light-emitting units 210 of different colors are defined as one pixel unit. For example, as shown in FIG. 5, three sub-pixels corresponding to three adjacent light-emitting units 210 in the column direction are defined as a pixel unit 20*a*. Or, along an adjacent row direction, three sub-pixels corresponding to three light-emitting units 210 of different colors in adjacent two pixel columns are defined as a pixel unit 20*b*. That is, the light-emitting units 210 of three sub-pixels in the pixel unit 20*b* are arranged in adjacent two columns of the pixel array 21 respectively. In this case, an arrangement obtained by reversing each pixel unit 20*b* at 180 degrees along the row direction is identical with an arrangement of an adjacent pixel unit 20*b* in the same column. It should be noted that, the pixel unit may be defined according to a specific algorithm of the display panel, which is schematically described but not limited herein.

Embodiment 2

A difference between this embodiment and Embodiment 1 lies in that, a plurality of sub-pixels in this embodiment correspond to four colors which are, for example, red, green, blue, and white, or red, green, blue, and yellow. A pixel array formed by light-emitting units of the multiple sub-pixels has pixel columns corresponding to two different colors in the column direction. For example, in the pixel array, the light-emitting units in some pixel columns correspond to two (for example, blue and white) of the four colors, and the light-emitting units in other pixel columns correspond to the other two colors (for example, red and green).

Figure 7:
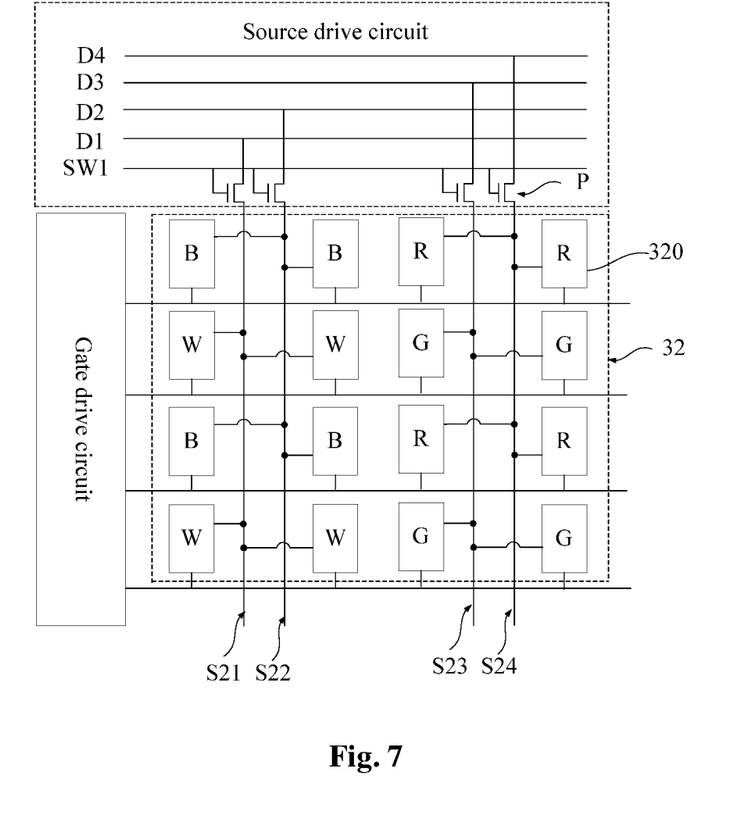
FIG. 7 is a schematic diagram showing a connection between a drive array and a peripheral drive circuit in a display panel in Embodiment 2 of the present application.

Specifically, referring to FIG. 7, in the drive array 32 of this embodiment, multiple drive switches 320 in some drive columns are electrically connected to light-emitting units corresponding to two of the four colors, and these drive columns are closely arranged next to each other in pairs. Multiple drive switches 320 in other drive columns are electrically connected to light-emitting units corresponding to the other two colors, and these drive columns are also arranged next to each other in pairs. In this manner, in all drive columns corresponding to two of the four colors, the drive switches of the two colors are connected to two corresponding data lines respectively. In all drive columns corresponding to the other two colors, the drive switches of the two colors are connected to the other two corresponding data lines respectively.

With continued reference to FIG. 7 continuously, in this embodiment, the plurality of sub-pixels 200 corresponds to four colors: red R, blue B, green G, and white W. In a drive array 32 formed by multiple drive switches 320 of the multiple sub-pixels, some drive columns comprise drive switches 320 corresponding to blue B and white W, and other drive columns comprise drive switches 320 corresponding to red R and green G The drive columns all corresponding to blue B and white W are closely arranged next to each other. Thus, in the two closely arranged drive columns, the drive switches 320 corresponding to blue B are all connected to a data line S22 and the drive switches 320 corresponding to white W are all connected to a data line S21. Similarly, the drive switches 320 corresponding to red R are all connected to a data line S24, and the drive switches 320 corresponding to green G are all connected to a data line S23.

In this embodiment, when the plurality of sub-pixels correspond to four colors, the drive switches corresponding to the same color in adjacent two drive columns can still be jointly connected to the same data line, such that each data line is connected to drive switches of the same color, thus a connection between the data lines and the peripheral drive circuit is simplified and further the structure of the peripheral drive circuit is simplified.

Moreover, based on the foregoing display panel, the present application also provides a display device having the above-described display panel. The display device has a desired display resolution and a display uniformity accordingly, and the structure of its peripheral drive circuit is simple.

To sum up, different from the conventional pixel arrangement in which the light-emitting units in the column direction correspond to the same color, the display panel provided by the present application applies different colors in the column direction of the pixel array, such that the display panel of the present application has a better display resolution and a display uniformity. As such, drive switches corresponding to the same color in adjacent two drive columns are connected to the same data line, and drive switches corresponding to the same color in different drive columns can be connected to the same data line, thus the number of the data lines is effectively reduced and further the structure of the peripheral drive circuit connected to the data lines is simplified.

The above merely describes preferred embodiments of the present application, and is not intended to limit the present application. Any replacements and modifications made by persons of ordinary skill in the art according to the disclosed content should all fall within the protection scope of claims of the present application.

What is claimed is:

1. A display panel, comprising:
a plurality of sub-pixels formed in a display region, each of the sub-pixels comprising a light emitting unit and a drive switch, the light-emitting unit comprising a first electrode, the drive switch being electrically connected to the first electrode, and the light-emitting units in the plurality of sub-pixels forming a pixel array comprising a plurality of pixel columns, wherein the light-emitting units in at least one pixel column of the pixel array correspond to the sub-pixels of at least two different colors; the drive switches in the plurality of sub-pixels form a drive array comprising a plurality of drive columns; and the drive array comprises two drive columns in which, the drive switches electrically connected to the light-emitting units of a same color are connected to a same data line, and
wherein the drive switches in a same drive column correspond to at most two different colors, and wherein two drive columns corresponding to a same group of two colors are closely arranged next to each other, and the drive switches corresponding to the same color in the two drive columns are connected to the same data line.

2. The display panel of claim 1, further comprising:
a peripheral drive circuit located in a non-display region, the peripheral drive circuit comprising a source drive circuit.

3. The display panel of claim 2, further comprising:
a plurality of switch elements, wherein the data line is connected to the source drive circuit via the corresponding switch element.

4. The display panel of claim 3, wherein the source drive circuit comprises a switch signal line and a plurality of data signal lines; the data line is connected to the switch signal line and a corresponding one of the plurality of data signal lines in the source drive circuit through the corresponding switch element; the switch signal line controls conductions of the plurality of switch elements, and the data signal lines provide data signals to the corresponding drive switches through the corresponding switch elements.

5. The display panel of claim 4, wherein each of the data signal lines provides a data signal for the drive switches corresponding to one of the colors, and the data lines corresponding to the same color are connected to the same data signal line.

6. The display panel of claim 1, wherein the plurality of sub-pixels correspond to three different colors, and in the drive array, the drive switches in some of the drive columns are electrically connected to the light-emitting units of one of the three different colors, and the drive switches in other ones of the drive columns are electrically connected to the light-emitting units of the other two colors of the three different colors, wherein the other ones of the drive columns are arranged in pairs with each pair of drive columns situated next to each other.

7. The display panel of claim 1, wherein the plurality of sub-pixels correspond to four different colors, and in the drive array, the drive switches in some of the drive columns are electrically connected to the light-emitting units of two of the four different colors, the some of the drive columns being arranged in pairs with each pair of drive columns situated next to each other in pairs, and the drive switches in other ones of the drive columns are electrically connected to the light-emitting units of the other two colors of the four different colors, the other ones of the drive columns also being arranged in pairs with each pair of drive columns situated next to each other.

8. The display panel of claim 1, wherein each drive switch has a contact node connected to the corresponding data line, the contact nodes of the drive switches corresponding to the same color in adjacent two drive columns are aligned in a column direction, and the contacts nodes aligned in the column direction are connected to the same data line.

9. The display panel of claim 1, wherein the plurality of sub-pixels correspond to three different colors; in a column direction of the pixel array, the light-emitting units corresponding to the three different colors are successively arranged; and in a row direction of the pixel array, the light-emitting units corresponding to the same color are staggered along the column direction.

10. The display panel of claim 1, wherein the plurality of sub-pixels form a plurality of pixel units arranged in an array, and each of the pixel units comprises three subpixels corresponding to three different colors.

11. The display panel of claim 10, wherein the light-emitting units in the three sub-pixels of each of the pixel units are arranged in adjacent two columns of the pixel array, and an arrangement obtained by reversing each of the pixel units at 180 degrees along a row direction is same as an arrangement of an adjacent pixel unit in the same column.

12. The display panel of claim 10, wherein the light-emitting units in the three sub-pixels of each of the pixel units are arranged in a same column.

13. A display device, comprising:
a display panel, wherein the display panel comprises a plurality of sub-pixels formed in a display region, each of the sub-pixels comprising a light-emitting unit and a drive switch, the light-emitting unit comprising a first electrode, the drive switch being electrically connected to the first electrode, and the light-emitting units in the plurality of sub-pixels forming a pixel array comprising a plurality of pixel columns, wherein the light-emitting units in at least one pixel column of the pixel array correspond to the sub-pixels of at least two different colors; the drive switches in the plurality of sub-pixels form a drive array comprising a plurality of drive columns; and the drive array comprises two drive columns in which, the drive switches electrically connected to the light-emitting units of a same color are connected to a same data line, and
wherein the drive switches in a same drive column correspond to at most two different colors, and wherein two drive columns corresponding to a same group of two colors are closely arranged next to each other, and the drive switches corresponding to the same color in the two drive columns are connected to the same data line.

14. The display device of claim 13, further comprising a peripheral drive circuit located in a non-display region, the peripheral drive circuit comprising a source drive circuit.

15. The display device of claim 14, further comprising a plurality of switch elements, wherein the data line is connected to the source drive circuit via the corresponding switch element.

16. The display device of claim 15, wherein the source drive circuit comprises a switch signal line and a plurality of data signal lines; the data line is connected to the switch signal line and a corresponding one of the plurality of data signal lines in the source drive circuit through the corresponding switch element; the switch signal line controls conductions of the plurality of switch elements, and the data signal lines provide data signals to the corresponding drive switches through the corresponding switch elements.

17. The display device of claim 16, wherein each of the data signal lines provides a data signal for the drive switches corresponding to one of the colors, and the data lines corresponding to the same color are connected to the same data signal line.

* * * * *